United States Patent [19]

Moravnik

[11] 4,397,302
[45] Aug. 9, 1983

[54] NON-FOCUSING SOLAR ENERGY CONCENTRATOR

[76] Inventor: Zvi Moravnik, Shmuel Hanatziv St. 41, Netanya, Israel

[21] Appl. No.: 184,020

[22] Filed: Sep. 4, 1980

[30] Foreign Application Priority Data

Sep. 9, 1979 [IL] Israel .................................. 57860
May 22, 1980 [IL] Israel .................................. 60137

[51] Int. Cl.³ ........................ F24J 3/02; G02B 5/04
[52] U.S. Cl. ................................ 126/440; 126/439; 350/286
[58] Field of Search ............. 126/439, 440, 438, 443; 350/286

[56] References Cited

U.S. PATENT DOCUMENTS 3,959,927 5/1972 Moultrie ........................... 350/286
4,003,364 1/1977 Balkus ............................... 126/438
4,024,852 3/1977 L'Esperance ................... 126/438

FOREIGN PATENT DOCUMENTS 2827708 1/1979 German Democratic Rep. ................................ 126/439

Primary Examiner—Albert W. Davis
Assistant Examiner—J. Anderson
Attorney, Agent, or Firm—Auslander, Thomas & Morrison

[57] ABSTRACT

Non-focusing solar energy concentration apparatus comprising one or more solar energy absorbing surfaces defining a first area and solar energy transmissive material disposed adjacent the absorbing surfaces and defining an incident surface having a second area greater than the first area, the incident surface being arranged to receive incident radiation from the sun, the solar energy transmissive material also defining a second surface for transmitting radiation to the at least one absorbing surface, the transmissive material having an index of refraction and a configuration selected to provide total internal reflection at the incident surface of radiation incident on the incident surface within a predetermined azimuthal range.

7 Claims, 5 Drawing Figures

NON-FOCUSING SOLAR ENERGY CONCENTRATOR

FIELD OF THE INVENTION

The present invention relates to solar energy concentrators and more particularly to non-focusing solar energy concentrators.

BACKGROUND OF THE INVENTION

A great variety of solar collectors are presently known and in use. The most popular construction is the flat plate collector which is normally employed in solar water heating installations. While the flat plate collector is useful for producing a relatively low temperature heat output in the vicinity of 60°–70° C., at higher temperatures it has extremely low efficiency. As a result, the flat plate collector is not suitable for generating steam.

There exist a number of important applications, such as power generation where the provision of high output temperatures is required. Current technology for producing such temperatures in solar collectors calls for a focussing collector in which an image of the sun is focussed on a solar absorber. Due to the movement of the sun during the day, tracking apparatus is generally required to keep the sun's image on the absorber surface.

Tracking apparatus is relatively expensive and cumbersome and requires continuing maintenance to maintain its operational efficiency. For this reason solar collector apparatus employing mechanical tracking has not gained market acceptance. Also, focussing collectors do not employ diffused radiation.

The present invention seeks to overcome disadvantages of the prior art solar collection apparatus and to provide solar collection apparatus which provides a high temperature output at relatively high efficiency and without requiring solar tracking apparatus, and which employs diffused radiation as well.

U.S. Pat. No. 4,162,824 discloses a non-imaging radiant energy collector and concentrator which employs elongate curved mirrors. U.S. Pat. No. 4,141,340 discloses a solar energy collector employing upstanding elongate absorber panels interdigitated with inclined mirrors. This configuration provides practically no concentration and appears to require a tracking device for efficient operation.

U.S. Pat. No. 4,069,812 describes a solar concentrator and energy collection system which operates on refraction and would appear to require the use of a tracking system for efficient operation. It does not absorb diffuce radiation.

None of the above-described references employ total internal reflection for concentrating solar radiation onto an absorber.

U.S. Pat. No. 4,154,219 describes a prismatic solar reflector and method of solar tracking which defines a focussing collector and employs total internal reflection of a prism for focussing light onto an absorber. The prism is characterized in that light enters and leaves through the same surface. The apparatus does not employ diffuse solar radiation. The prisms are spaced from the absorber surface. A similar disclosure is to be found in "Prisms with Total Internal Reflection as Solar Reflectors" by Ari Rabl in Solar Energy, Vol. 19, pp. 555–565, Pergamon Press 1977. These disclosures may be readily distinguished from the present invention as described hereinbelow in that they relate to focussing collectors, rather than to non-focussing collectors which are the subject of the present invention.

U.S. Pat. No. 4,056,094 discloses a solar heat collector which employs total internal reflection for reflection but not for concentration.

U.S. Pat. No. 4,045,246 describes a two-stage concentrator and employs a liquid with an index of refraction higher than that of air. This liquid is not used to provide total internal reflection.

None of the references discussed hereinabove describes or suggests the provision of a non-focussing solar concentrator employing total internal reflection.

SUMMARY OF THE INVENTION

There is provided in accordance with the present invention non-focusing solar energy concentration apparatus comprising at least one solar energy absorbing surface defining a first area and solar energy transmissive material disposed adjacent the absorbing surface defining an incident surface having a second area greater than the first area for receiving incident radiation from the sun and a second surface for transmitting radiation to the absorbing surface, the transmissive material having an index of refraction and a configuration selected to provide total internal reflection at the incident surface of radiation incident on the incident surface within a predetermined azimuthal range.

Further in accordance with an embodiment of the invention, the incident radiation includes diffuse radiation.

Additionally in accordance with an embodiment of the invention, the concentration apparatus also comprises reflectors associated with a surface of the transmissive material for directing radiation towards the absorbing surface.

Further in accordance with an embodiment of the present invention, the incident surface defines at least one surface which is generally transparent to incident solar radiation from the atmosphere and substantially reflective of radiation reflected within the transmissive material.

In accordance with a preferred embodiment of the present invention, the transmissive material has a generally trapezoidal cross section on each side of the absorber surface.

BRIEF DESCRIPTION OF THE DRAWINGS

The invention will be more fully understood and appreciated from the following detailed description taken in conjunction with the drawing in which.

DETAILED DESCRIPTION OF THE INVENTION

Figure 1:
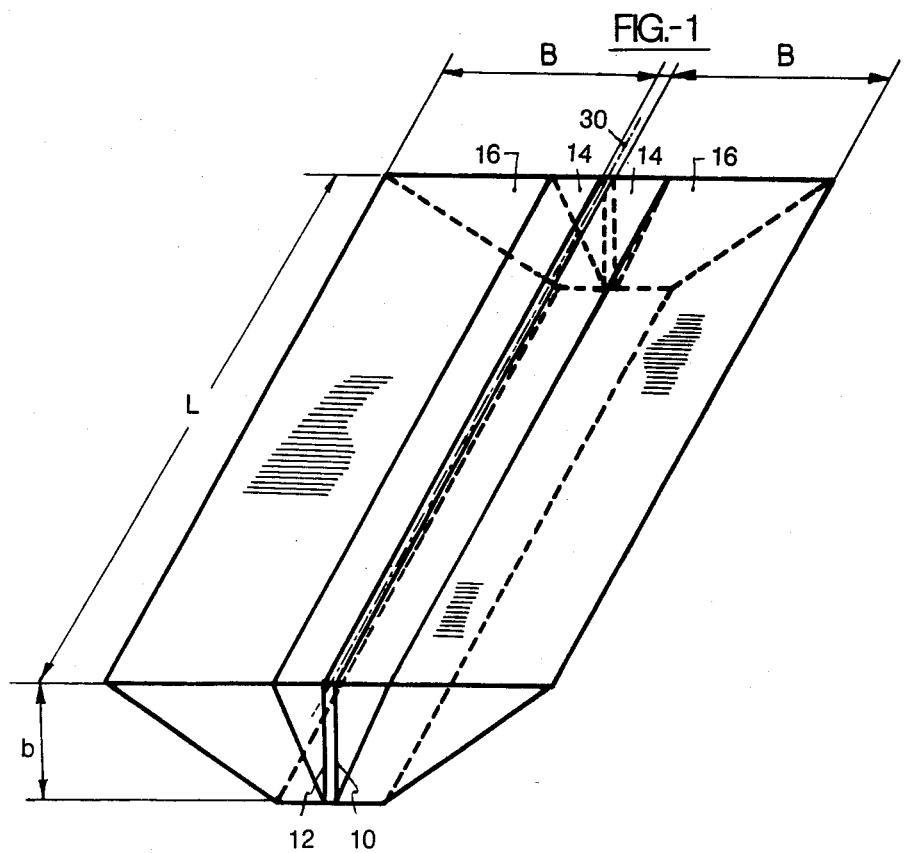
FIG. 1 is a pictorial illustration of solar energy collection apparatus constructed and operative in accordance with an embodiment of the present invention.
Figure 2:
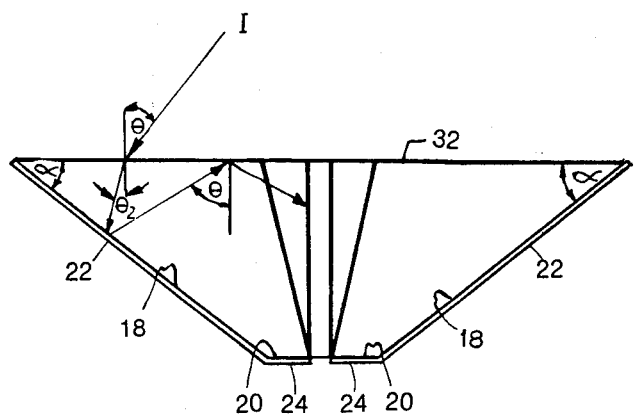
FIG. 2 is a sectional illustration of the embodiment of FIG. 1.

Referring now to FIGS. 1 and 2 there is seen a preferred embodiment of solar energy concentration apparatus constructed and operative in accordance with an embodiment of the present invention. In accordance with the illustrated preferred embodiment, the collection apparatus comprises first and second elongate solar absorber plates 10 and 12 disposed in generally spaced back to back relationship. Solar absorber plates 10 and 12 typically comprise metal strips having a low emissivity coating, such as black paint and are arranged in communication with flowing fluid in a manner not illustrated herein for heat transfer thereto. The exact construction of the heat exchanger which is in thermal communication with the solar absorber plates 10 and 12 may be entirely conventional.

Disposed adjacent each solar absorber plate is an elongate volume 14 of a material having an index of refraction greater than that of air. According to a preferred embodiment of the invention, volume 14 contains carbon disulfide ($CS_2$) having an index of refraction of approximately 1.65. Volume 14 may be defined by walls of a solar energy transmissive material such as glass or perspex, and has a triangular cross section.

Disposed adjacent volume 14 is a second elongate volume 16 of a cross section which together with the cross section of volume 14 defines a trapezoid. Volume 16 typically comprises a material having an index of refraction less than that of the material contained in volume 14. According to a preferred embodiment of the invention, volume 16 contains water having an index of refraction of 1.33. Volume 16, similarly to volume 14 may be defined by walls of glass or any other suitable material. Alternatively, solid materials may fill volumes 14 and 16 and thus no walls are required. Materials such as plastics may be employed.

Arranged along the underside and bottom surfaces 18 and 20 of volume 16 are reflecting mirrors 22 and 24 having their reflecting surfaces facing towards volume 16.

It will be appreciated by persons skilled in the art that the geometry of volumes 14 and 16 and the indices of refraction thereof are selected in order to maximize the efficiency of the solar energy collector apparatus at a desired output temperature for a desired location and solar radiation conditions. The criteria for such selection will be described and explained hereinafter.

It is noted for example that a trapezoidal cross section is employed rather than a simple triangular cross section to provide an increased ratio of collector surface area to absorber surface area. The additional volume, defined by volume 14, is filled with a material of higher index of refraction than that of volume 16 in order to direct the radiation incident upon volume 14 from the atmosphere and from volume 16 onto the absorber surface, and more particularly to provide total internal reflection for radiation travelling from volume 14 towards volume 16 at the interface between the volumes. It is appreciated that any desired number of volumes having differing indices of refraction may be employed in combination to define the radiation pathway from the atmosphere to the absorber surface.

Reflecting mirrors 22 and 24 may be separate from volume 16 or may be coatings formed thereon. Alternatively reflecting mirrors 22 and 24 may be omitted.

Considering the geometry of the exemplary solar collector configuration of FIGS. 1 and 2 it is appreciated that the broadest surface is oriented such that the perpendicular thereto faces the median position of the sun during the day and the arc described by the sun during the day defines a plane perpendicular to the longitudinal axis 30 of the collector.

For the purposes of illustration and description, the surface facing the median location of the sun is identified by reference numeral 32, its length is termed L and its overall width is 2B. The area of the facing surface is given by:

$$A = L \times 2B \quad (1)$$

The width of each of solar absorber plates 10 and 12 is termed b and their length is L so that the total area of the absorber surfaces is given by:

$$a = 2 \times (L \times b) \quad (2)$$

The solar radiation intensity on the absorber surface is given by:

$$S_i = IA\eta_r \cos(\theta)(1/a) \quad (3)$$

where I is the global radiation including both direct radiation and diffused radiation; $\eta_r$ is the optical efficiency of the collector, a factor which takes into account reflection losses due to the absence of total internal reflection, and $\theta$ is the angle between the position of the sun at any time and the plane parallel to the axis 30 and to the normal to the facing surface.

It is desired to maximize the useful energy produced by the collector, which is given by:

$$Q_u = F_R a (S_i - U_L(T_{liq} - T_{amb})) \quad (4)$$

where
$F_R$ is a constant
$U_L$ is a coefficient representing convection losses.
$T_{liq}$ is the temperature of the liquid adjacent the absorber surface;
$T_{amb}$ is the atmospheric temperature.

It may be appreciated that by maximizing the ratio of B/b, the geometrical concentration ratio of the apparatus is maximized. It will now be shown that there exists a trade-off between the maximization of B/b and the maximization of the amount of radiation which is subject to total internal reflection within volumes 14 and 16.

The critical angle $\theta$ for total internal reflection between bodies of different indices of reflection is given by Snell's law:

$$\theta = Inv \sin \frac{\text{index of refraction body } A}{\text{index of refraction body } B} \quad (5)$$

where the radiation is travelling from body B to body A and the index of refraction of B is greater than the index of refraction of A.

Thus in the case where body A is air, whose index of refraction is equal to unity, the greater the index of refraction of body B the larger the critical angle.

If $\alpha$ is the acute angle between the facing and underside surfaces 32 and 18, it may be appreciated that:

$$2\alpha = \theta + \theta_2 \quad (6)$$

where $\theta_2$ is the maximum permissible azimuth angle for which total internal reflection will be achieved.

Thus in order to determine the values of $\alpha$ and $\theta_2$ which provide a maximum $Q_u$ for a given location, the values for solar radiation intensity for various azimuthal angles through the day for each given location must be considered. Such values are known in the literature.

Thus for example it has been found that for a location in Ohio U.S.A. an α of 30° provides a maximum amount of useful energy over an entire day. It is appreciated that each given location, having a different intensity pattern for solar radiation as a function of azimuthal angle of the sun's position, has a different preferred angle α.

Figure 3:
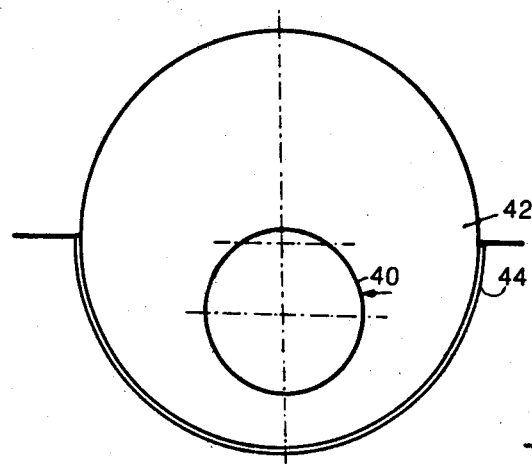
FIGS. 3, 4 and 5 are sectional illustrations of alternative embodiments of solar energy collection apparatus constructed and operative in accordance with the present invention.
Figure 4:
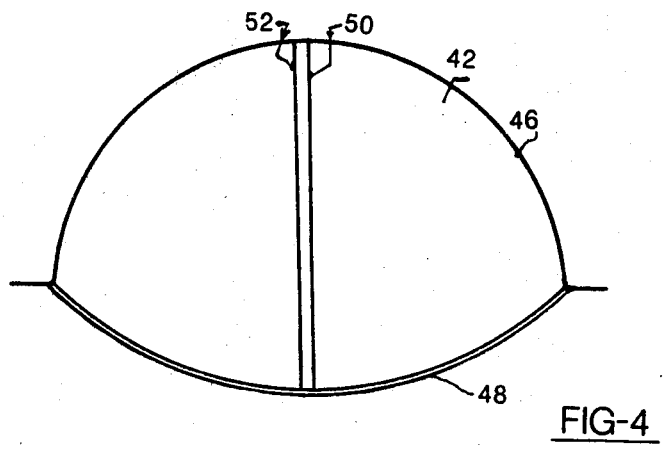
Figure 5:
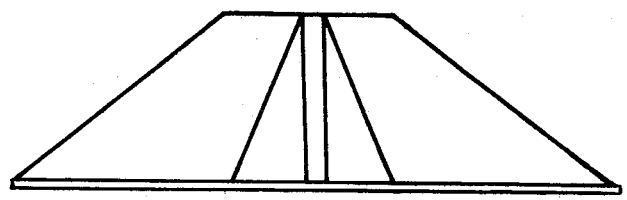

Reference is now made to FIGS. 3, 4 and 5 which illustrate in cross-sectional illustration, alternative embodiments of the invention. FIG. 3 shows a collector of circular cross section comprising an absorber surface 40 of circular cross section which is disposed within a volume 42 containing a material such as water which has desired characteristics of total internal reflection, as described hereinabove. The absorber surface 40 may be arranged in the center of the cross section of volume 42 or alternatively, off center, as illustrated. A mirror surface or coating 44 may be provided on a portion of the outer surface of volume 42 for providing desired reflection onto the absorber surface. Alternatively this may be omitted.

FIG. 4 illustrates an alternative embodiment of the invention in which volume 42 defines facing and back surfaces 46 and 48 of differing cross sectional radii. In this embodiment, a pair of planar absorber surfaces 50 and 52 are employed, and a heat absorbing fluid is circulated in association therewith.

FIG. 5 illustrates a further alternative embodiment of the invention in which a geometry substantially similar to that of FIGS. 1 and 2 is employed in an upside down orientation, such that the solar energy receiving surface is defined by a plurality of surfaces angled with respect to each other and the bottom surface, which may be provided with a reflective coating is flat.

It will be appreciated by persons skilled in the art that the invention is not limited to any particular geometry or arrangement of absorber surfaces or number of volumes of differing index of refraction. The scope of the present invention is defined only by the claims which follow.

I claim:

1. Non-focusing solar energy concentration apparatus comprising:

first and second closely spaced parallel back-to-back solar energy absorbing plates having a low emissivity coating and arranged in communication with flowing fluid therebetween for heat transfer thereto, each plate defining a planar surface and having a first surface area;

solar energy transmissive material disposed adjacent said first and second parallel absorbing plates and defining co-planar first and second incident surfaces arranged to receive incident radiation from the sun, each of said first and second incident surfaces having a surface area which is greater than said first surface area, said solar energy transmissive material also defining first and second adjacent surfaces disposed adjacent said first and second parallel absorbing surfaces for transmitting radiation thereto;

said first and second incident surfaces lying perpendicular to said first and second absorbing surfaces;

said transmissive material having an index of refraction and a configuration selected to provide total internal reflection at said first and second incident surfaces of radiation incident on said incident surfaces within a predetermined azimuthal range, said plates being surrounded externally along said planar surfaces by said transmissive material thus providing thermal insulation for said plates.

2. Apparatus according to claim 1 and wherein said first and second adjacent surfaces lie parallel to said first and second absorbing plates.

3. Apparatus according to claim 1 and wherein said incident radiation includes diffuse radiation.

4. Apparatus according to claim 1 and also comprising reflector means associated with surfaces of said transmissive material for directing radiation towards said absorbing surfaces.

5. Apparatus according to claim 1 and wherein said transmissive material has a generally trapezoidal cross section.

6. Apparatus according to claim 1 and wherein said transmissive material comprises two separate transmissive materials having different indices of refraction.

7. Apparatus according to claim 1 and wherein said transmissive material comprises at least first and second transmissive materials, said second transmissive material being disposed intermediate said first transmissive material and said absorbing plates, said second transmissive material having a higher index of refraction than said first transmissive material.

* * * * *